United States Patent
Sheerer et al.

(10) Patent No.: US 10,657,846 B2
(45) Date of Patent: May 19, 2020

(54) EDUCATIONAL KITS FOR SURFBOARD CONSTRUCTION

(71) Applicants: Christian Peter Sheerer, Sunnyvale, CA (US); Carl Fredric Weitz, Capitola, CA (US)

(72) Inventors: Christian Peter Sheerer, Sunnyvale, CA (US); Carl Fredric Weitz, Capitola, CA (US)

(*) Notice: Subject to any disclaimer, the term of this patent is extended or adjusted under 35 U.S.C. 154(b) by 64 days.

(21) Appl. No.: 14/217,441

(22) Filed: Mar. 17, 2014

(65) Prior Publication Data

US 2015/0235572 A1 Aug. 20, 2015

Related U.S. Application Data

(60) Provisional application No. 61/802,329, filed on Mar. 15, 2013.

(51) Int. Cl.
*G09B 25/00* (2006.01)
*G09B 19/00* (2006.01)

(52) U.S. Cl.
CPC .......... *G09B 25/00* (2013.01); *G09B 19/0038* (2013.01)

(58) Field of Classification Search
USPC ........................................................ 434/373
See application file for complete search history.

(56) References Cited

U.S. PATENT DOCUMENTS

| | | | | | |
|---|---|---|---|---|---|
| 2,388,340 | A | * | 11/1945 | Ripley | A63H 23/005 446/88 |
| 4,938,040 | A | * | 7/1990 | Humphreys, Jr. | E05B 73/0005 70/14 |
| 8,540,197 | B1 | * | 9/2013 | Krol, II | A63C 17/0006 211/DIG. 1 |

OTHER PUBLICATIONS

Pirsch, Stephen, "How to Build Your First Surfboard", accessed at: http://www.surfersteve.com/introduction.htm (2003).*
YouTube, "How to Build Your First Surfboard—Familiarizing Yourself With Materials", accessed at: https://www.youtube.com/watch?v=69X3hy67gWA (Jan. 5, 2011).*
Revell, "Pinewood Derby Wedge Basic Racer Kit", accessed at: https://web.archive.org/web/20110307110447/https://www.revell.com/pinewood-derby/rmxy8660.html (published Mar. 7, 2011).*
Thorne, "Getting Started in Pinewood Derby: Step-By-Step Workbook to Building Your First Car", accessed at: https://www.amazon.com/Getting-Started-Pinewood-Derby-Step/dp/1565236173 (published Nov. 1, 2011).*
ABC Pinewood Car, "Getting Started in Pinewood Derby: Step-By-Step Workbook to Building Your First Car", accessed at: https://www.abc-pinewood-derby.com/getting-started-in-pinewood-derby.php (accessed on Aug. 13, 2018).*
Surfboard Miniatures, accessed at: https://web.archive.org/web/20120229081746/http://www.surfboardminiatures.com:80/ (published Feb. 29, 2012).*

(Continued)

*Primary Examiner* — James B Hull
(74) *Attorney, Agent, or Firm* — Jeffery D. Frazier, Esq.

(57) ABSTRACT

Educational and instructive kits for surfboard construction are provided. In accordance with various embodiments of the present teachings, kits for making wooden and fiberglass scale-model surfboards can include blanks, templates, instructions, and/or other materials. A kit in accordance with the present teachings provides an educational tool for developing the skills for, and an understanding of, surfboard construction. As well, a kit of the present teachings can be employed in scale-model prototyping of surfboard designs.

16 Claims, 9 Drawing Sheets

(56) References Cited

OTHER PUBLICATIONS

Schleicher, Robert, "Paint a pinewood derby racer", accessed at: https://web.archive.org/web/20120224024712/https://boyslife.org/hobbies-projects/projects/11508/paint-a-pinewood-derby-racer/ (published Feb. 2000).*

Thorne, Troy. "Getting Started in Pinewood Derby: Step-By-Step Workbook", Fox Chapel Publishing (published Nov. 1, 2011).*

* cited by examiner

EDUCATIONAL KITS FOR SURFBOARD CONSTRUCTION

RELATED APPLICATIONS

This application claims a priority benefit from U.S. Provisional Patent Application Ser. No. 61/802,329, filed Mar. 15, 2013; incorporated herein by reference.

FIELD

The present teachings relate to the field of surfboards and surfboard construction, and to kits for making scale-model surfboards that educate on techniques used in the construction of full-scale surfboards.

INTRODUCTION

Building even a simple surfboard, whether in wood or foam/fiberglass, generally requires knowledge and materials beyond that possessed by the typical layperson. It can be a daunting task for the uninitiated to take on a surfboard-making project. Many simply do not start, or finish, their project.

Instructional kits for constructing scale-model surfboards would convey to interested laypersons the knowledge needed for making a surfboard. As well, such kits could conveniently provide at least the core materials used in surfboard construction.

When skilled makers of surfboards want to construct and test a new design concept, they build a full scale surfboard, which can take time and be costly. The time and cost can be wasted for those designs that turn out to be unappealing.

Kits for constructing scale-model surfboards would allow for faster prototyping, saving both time and money.

Engineers can employ scale models to test the likely performance of a particular design without incurring the full expense of a full-sized prototype.

SUMMARY

A non-limiting summary of the present teachings is set out next.

According to various embodiments, educational kits for surfboard construction are provided. In various embodiments of the present teachings, educational kits for making wooden and/or fiberglass scale-model surfboards can include, for example, blanks, templates, instructions, and/or other materials. An educational kit in accordance with the present teachings, according to various embodiments, can provide an educational tool for developing the skills for, and an understanding of, general surfboard construction. Users can, for example, transfer their learnings from use of the educational kits of the present teachings to the construction of full-sized surfboards, as desired.

In accordance with various embodiments, a kit of the present teachings can be employed in scale-model prototyping of surfboard designs.

As used herein, "scale model" refers to a physical model, a representation, or copy of an object that is smaller than, or reduced from, the actual size of the object, which seeks to maintain the relative proportions (the scale factor) of the physical size of the original object. As will become apparent herein, scale models in accordance with the present teachings can be used as a guide to making the object (in this case, a surfboard) in full size. In various embodiments, scale-model surfboards constructed in accordance with various embodiments of the present teachings comprise no greater than about 3/4 scale models, no greater than about 1/2 scale models, no greater than about 1/4 scale models, no greater than about 1/8$^{th}$ scale models, no greater than about 1/16$^{th}$ scale models, or less. In various embodiments, scale-model surfboards constructed in accordance with various embodiments of the present teachings comprise dimensions of no greater than about 8"×32", and in some embodiments no greater than about 6"×24", and in other embodiments no greater than about 4"×16", and in other embodiments no greater than about 3"×12", and in other embodiments no greater than about 2"×8", or less.

Various aspects of the present teachings relate to an instructional kit for the construction of a scale-model surfboard. In accordance with various embodiments, a kit of the present teachings can comprise: a generally rectangular blank having dimensions of no more than about 8"×32", and in some embodiments no more than about 6"×24", and in other embodiments no more than about 4"×16", and in other embodiments no more than about 3"×12", and in other embodiments no more than about 2"×8", with the blank including a rocker curve; a template dimensioned to fit on the blank for tracing, with the template representing in outline fashion a scale-model surfboard for construction; and, instructions regarding the construction of the scale-model surfboard, which can include for example one or more of shaping, cutting, sanding, and/or coating, which includes actual techniques utilized in full-size surfboard construction, thereby educating a user regarding such techniques.

In various embodiments, the kit can further comprise one or more fins, and/or materials and/or compositions for making one or more fins.

Various aspects of the present teachings relate to a prototyping kit for the construction of a scale-model surfboard. In accordance with various embodiments, such a kit of the present teachings can comprise: a generally rectangular blank having dimensions of no more than about 8"×32", and in some embodiments no more than about 6"×24", and in other embodiments no more than about 4"×16", and in other embodiments no more than about 3"×12", and in other embodiments no greater than about 2"×8", with the blank including a rocker curve; a template dimensioned to fit on the blank for tracing, with the template representing in outline fashion a scale-model surfboard for construction; and, instructions regarding the construction of the scale-model surfboard which include actual techniques utilized in full-size surfboard construction.

In various embodiments, the kit can further comprise one or more fins, and/or materials and/or compositions for making one or more fins.

In accordance with various embodiments, the kit of the present teachings can further comprise an abrasive material for sanding the blank. The abrasive can be naturally occurring or manufactured. In some embodiments, the abrasive material can comprise one or more pieces of sandpaper. According to various embodiments, such sandpaper can comprise a grit within a range of from about 36 grit to about 600 grit (e.g., 100, 220, and/or 400 grit).

In various embodiments, the kit of the present teachings further comprises an adhesive. In some embodiments, the adhesive comprises a fluid adhesive, such as a glue composition. For example, in some embodiments, an acrylic polymer emulsion or ELMER'S® (polyvinyl acetate) is provided.

In various embodiments, the kit of the present teachings further comprises at least one coating composition. In some embodiments, the coating composition comprises a coloring composition. In various embodiments, the coloring composition comprises a stain or paint. For example, in some embodiments, a liquid or a powder stain (e.g., iron oxide) can be provided. In a variety of embodiments, the coating composition comprises a wax coating. For example, in some embodiments, beeswax, carnauba, or paraffin is provided.

In various embodiments, the kit of the present teachings further comprises at least one item of personal protective gear. In some embodiments, the protective gear comprises a mask or respirator for mitigating or eliminating dust/particulates. In various embodiments, the protective gear comprises gloves. For example, rubber gloves can be provided. In other embodiments, the protective gear comprises one or more items of protective clothing, such as a smock, shoe covers, etc.

In various embodiments, the kit of the present teachings further comprises a stand for supporting a blank or scale-model surfboard. In some embodiments, the kit further comprises means for magnetically attaching or affixing a blank or scale-model surfboard to the stand. For example, and without limitation, one or more magnets of one polarity can be attached to a stand and one or more magnets of an opposing polarity can be attached to a blank or scale-model surfboard, so the stand and blank or scale-model surfboard can be held together by the attractive forces of the magnets. In other embodiments, metal tabs can be inserted into the blank or scale-model surfboard and magnets attached to the stand, or vice versa. Magnetic attraction between the metal tabs and the magnets can assist in stabilizing the blank or scale-model surfboard, e.g., while processing the blank or scale-model surfboard (e.g., while applying a coating). In some embodiments, a blank is held by magnetic means while a resin coating is applied. In addition, or as an alternative, such a stand can be used for display purposes.

In various embodiments, the kit of the present teachings further comprises audio-visual instructional and/or background material presenting information relevant to surfboards and/or surfboard construction. For example, and without limitation, the material can be provided on CD, DVD, VHS or other tape, a thumb drive, disk drive, over the internet or other network as a multimedia file (e.g., a streaming multimedia file), and the like. In some embodiments, such material is provided on a hosted website, such as YOUTUBE®. In other embodiments, such material is provided on a supplier's website and/or user forum.

In various embodiments, the kit of the present teachings further comprises instructions to access an online forum for user-provided posts concerning surfboards and/or surfboard construction. For example, and without limitation, the forum can be a public forum or a private (e.g., password protected) forum. Further, in various embodiments, the forum can be open or moderated.

In various embodiments, the kit of the present teachings further comprises fiberglass cloth.

In various embodiments, the kit of the present teachings further comprises fiberglass resin. In some embodiments, epoxy or polyester resin is provided.

In various embodiments, the kit of the present teachings further comprises one or more fiberglass working tools, e.g., one or more of a mixing cup, a stirring stick, a resin brush, and the like.

Various aspects of the present teachings relate to a method for prototyping of a scale-model surfboard. According to various embodiments, such a method can comprise: (i) selecting a design of a full-size surfboard to be prototyped; (ii) providing a kit comprising (a) a generally rectangular blank including a rocker curve; (b) a template dimensioned to fit on the blank for tracing, the template representing in outline fashion a scale-model of the full-sized surfboard to be prototyped; and, (c) instructions comprising a plurality of steps for the construction of the scale-model surfboard, the instructions describing one or more techniques utilized in full-size surfboard construction; and (iii) using the kit, constructing a scale-model surfboard representative of the full-sized surfboard to be prototyped.

BRIEF DESCRIPTION OF THE DRAWINGS

These and other embodiments of the disclosure will be discussed with reference to the following exemplary and non-limiting illustrations, in which like elements are numbered similarly, and where.

DESCRIPTION

Figure 1:
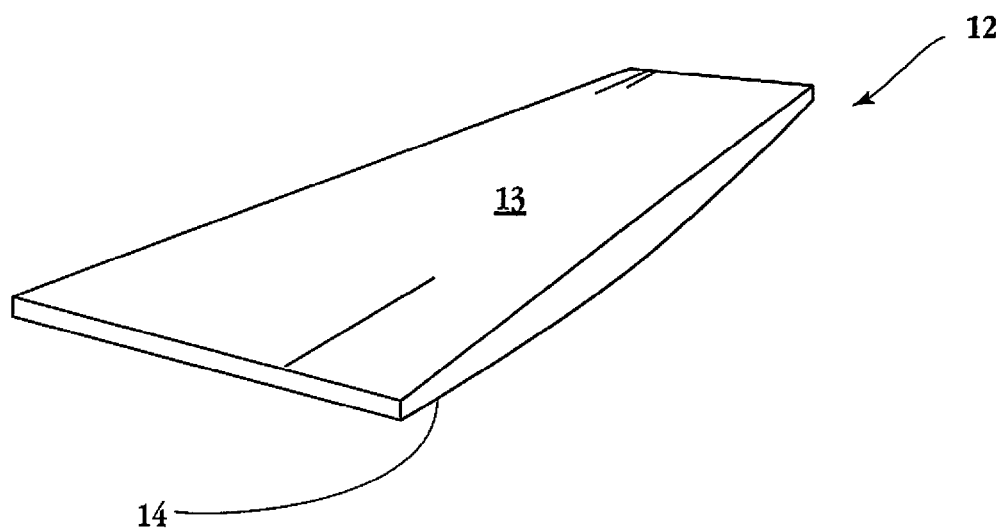
FIG. 1 is a perspective view of a pre-shaped blank comprising a top and a bottom curve (rocker), in accordance with various embodiments.

Reference will now be made to various embodiments. While the present teachings will be described in conjunction with various embodiments, it will be understood that they are not intended to limit the present teachings to those embodiments. On the contrary, the present teachings are intended to cover various alternatives, modifications, and equivalents, as will be appreciated by those of skill in the art.

Various aspects of the present teachings provide educational kits and methods of use for surfboard construction. In various embodiments of the present teachings, kits for making wooden and/or fiberglass scale-model surfboards can include, for example, blanks, templates, instructions, and/or other materials. An educational kit in accordance with the present teachings, according to various embodiments, can provide an educational tool for developing the skills for, and an understanding of, general surfboard construction. As well, in accordance with various embodiments, a kit of the present teachings can be employed in scale-model prototyping of surfboard designs.

According to various embodiments, a kit of the present teachings can include, among other things, an educational instruction manual in hard and/or soft copy format (e.g., PDF), as well as a link and/or pointer to the manual available on the internet or other network (e.g., on an internet website, e.g., FTP site).

In various embodiments, an instruction manual can be used by a person (a user), so as to provide information to inform the person how to construct a scale model surfboard, in accordance with the present teachings. The instruction manual can comprise, for example, a loose leaf type binder. A plurality of pages can be provided in the loose leaf type binder. Printed content can be provided on the pages, for supplying information to the person. The printed content can include, for example, a listing of various steps for constructing a scale model surfboard, in accordance with the present teachings. A DVD (or other storage medium) can be provided to be used by the person. The DVD can be inserted into a DVD player and played, so as to provide supplemental information to inform the person on how to construct a scale model surfboard. The supplemental information on the DVD can include, e.g., audio-visual content, showing how to follow the listing of various steps of the printed content on the pages in the loose leaf type binder of the instruction manual.

Kits of the present teachings can, for example, inform a user regarding aspects of the history of surfboard evolution, stories about notable or legendary surfboard makers (and/or surfers), and various types of surfboard construction. Further, kits of the present teachings can, for example, encourage people of various ages to experience what it is like to make something of relative complexity with their hands and imagination.

It will be appreciated that various embodiments of kits of the present teachings can be used by surfboard manufacturers of various experience levels, for example, for prototyping designs.

Various embodiments of educational kits of the present teachings can inform users about one or more of: (i) the various types of materials that have been used in surfboard construction, over the years; (ii) what types of materials/chemicals are compatible with each other, or not; (iii) aspects of safety when making a surfboard, such as chemicals, tools, ventilation, and the like; and/or (iv) issues regarding the surfboard manufacturing industry and the environment.

In various embodiments, an educational kit of the present teachings can further comprise audio-visual instructional material presenting information relevant to surfboards and/or surfboard construction. For example, and without limitation, the material can be provided on CD, DVD, VHS or other tape, a thumb (flash) drive, disk drive, over the internet or other network as a multimedia file (e.g., a streaming multimedia file), and the like. According to various embodiments, instructional material (e.g., step-by-step instructions) can be provided by way of a hosted multimedia website, e.g., YOUTUBE®.

In various embodiments, an educational kit of the present teachings can comprise instructions to access an online forum for user-provided posts concerning surfboards and/or surfboard construction. For example, and without limitation, the forum can be a public forum or a private (e.g., password protected) forum. Further, in various embodiments, the forum can be open or moderated. In various embodiments, users can receive step-by-step instruction and/or communicate with other users by way of a forum and/or website.

According to various embodiments, one or more of the elements, parts, components, and the like, included in the kits of the present teachings can be contained in packaging, such as a cardboard box, or other suitable packaging. In various embodiments, packaging employed for containing the elements, parts, components, and the like, of a kit of the present teachings is suitable for transport to distribution and retail sites, and in some embodiments for delivery by mail, courier, and the like. In various embodiments, packaging of the present teachings is biodegradable.

In various embodiments, an educational kit for the construction of a scale-model surfboard, according to the present teachings, can comprise: a generally rectangular blank including a top and a bottom comprising a rocker curve; a template dimensioned to fit on the blank for tracing, with the template representing in outline fashion a scale-model surfboard for construction; one or more fins for the surfboard; and, instructions regarding the construction of the scale-model surfboard (e.g., including, for example, cutting, sanding, and coating) which employs techniques utilized in full-size surfboard construction.

In some embodiments, such kits can be used by an experienced surfboard maker and/or engineer in relatively rapid and inexpensive making and testing of design concepts. In various embodiments, such kits can be used by persons inexperienced in surfboard construction that desire to learn how to construct a surfboard and, optionally, to apply their learnings to a full scale surfboard.

Wooden Surfboards

According to various embodiments, kits for constructing wooden surfboards, in accordance with the present teachings, can include one or more of the following:

In accordance with various embodiments, a blank can be provided, such as blank 12 depicted in FIG. 1, comprising balsawood, or other lightweight buoyant wood. In some embodiments basswood is employed. The blank can be provided pre-shaped, e.g., being generally rectangular with a top 13 and a bottom comprising a curve (rocker) 14. Pre-shaping can be accomplished, for example, by way of sanding. The blank can comprise one solid piece of wood, as in FIG. 1, or multiple pieces (e.g., strips) that are held together, e.g., by a glue, such as a non-toxic wood glue. According to various embodiments, the blank can be emblazoned with a decal, logo, or emblem, which can be applied to, or embossed into, the wood.

Figure 2A:
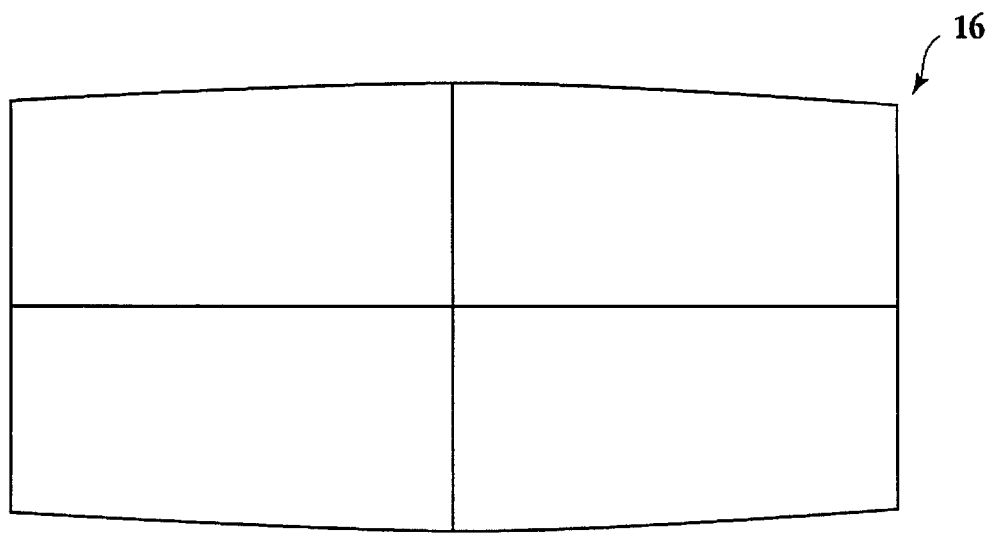
FIGS. 2A and 2B schematically depict a template comprising an outline of a surfboard to be constructed, according to various embodiments.
Figure 2B:
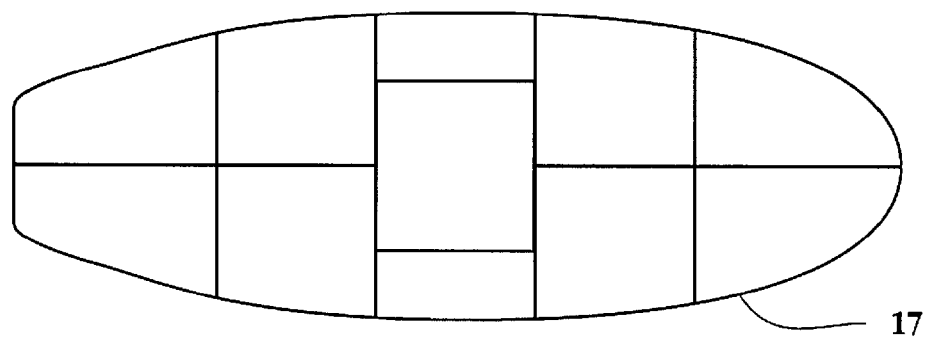

According to various embodiments, and referring now to FIG. 2, a template 16 can be provided comprising an outline 17 of a surfboard to be constructed. The template can be, for example, a paper, paperboard, or cardboard template. A user can cut the template out with scissors, a knife, a razorblade, or the like, and place it on the blank. Next, the user can trace around the template with a drawing instrument, such as a pen, pencil, or marker (which can be included in the kit), to create an outline of the surfboard on the blank. Various templates can be made available, e.g., at the kit's point of sale, by mail, by email, and/or via an internet e-commerce website. In some embodiments, a user can select from among a plurality of templates available from a supplier's website. For example, according to various embodiments, a user can download an electronic file, such as a PDF file, containing a desired template, and print the template on their computer- or network-connected printer.

According to various embodiments, a kit in accordance with the present teachings can include from about two to about five strips of sandpaper, and in some embodiments about three strips of sandpaper, of various grits. In some embodiments, a sanding block is included. Such strips of sandpaper can be used, among other ways, to form rails and/or to form the contours of the perimeter of the surfboard.

In various embodiments, a dust mask or particulate respirator can be provided for a user to wear. For example, the mask or respirator can be configured to mitigate or prevent the inhalation of dust and/or other particulates while shaping the blank. In a variety of embodiments, respirators comprise air-purifying respirators, which use filters, cartridges, or canisters to remove contaminants from the air breathed.

Figure 3:
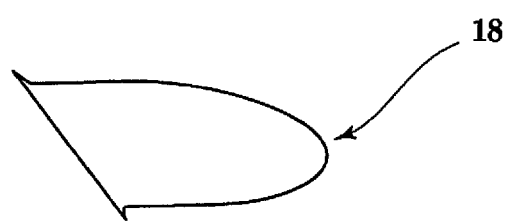
FIG. 3 is a perspective view of a wooden fin for attachment to a surfboard, according to various embodiments.

In various embodiments, one or more fins can be provided, such as wooden fin 18 of FIG. 3. The number and type of fins can depend, for example, on the type or model of surfboard to be constructed. According to various embodiments, one or more skeg and/or rail fins can be employed. The fin(s) can be of any suitable size and shape. According to various embodiments, the fin(s) can be laser or die cut out of wood. The fin(s) can be permanently affixed to the surfboard, or removably attached to it.

In accordance with various embodiments, an adhesive can be included in the kit. In various embodiments, for example, the adhesive can comprise one or more tubes or packets of glue. The glue can be employed, for example, to affix the fin(s) to the shaped surfboard. In various embodiments, a non-toxic glue is employed.

According to some embodiments, a coating material is included comprising a drying oil, such as Tung oil or linseed oil.

In accordance with various embodiments, a stain can be included in the kit. In various embodiments, for example, the stain can comprise a non-toxic, iron oxide (or other type of) powder in a suitable container or bag. Water can be added and the stain applied to the shaped surfboard, e.g., using a paper towel. According to various embodiments, multiple coats can be applied, as desired.

In accordance with various embodiments, a wax coating can be included in the kit. In various embodiments, for example, the wax coating can comprise a non-toxic wax coating (e.g., linseed oil and beeswax). The wax coating can be applied, for example, using a paper towel or soft cloth. In accordance with various embodiments, from about four to about five coats can be applied, allowing for about 24 hours of dry-time in between coats. In various embodiments, once a coat has dried, the user can "buff" the surfboard, before applying the next coat. This can help to achieve what is known as a semi-gloss finish.

Figure 4:
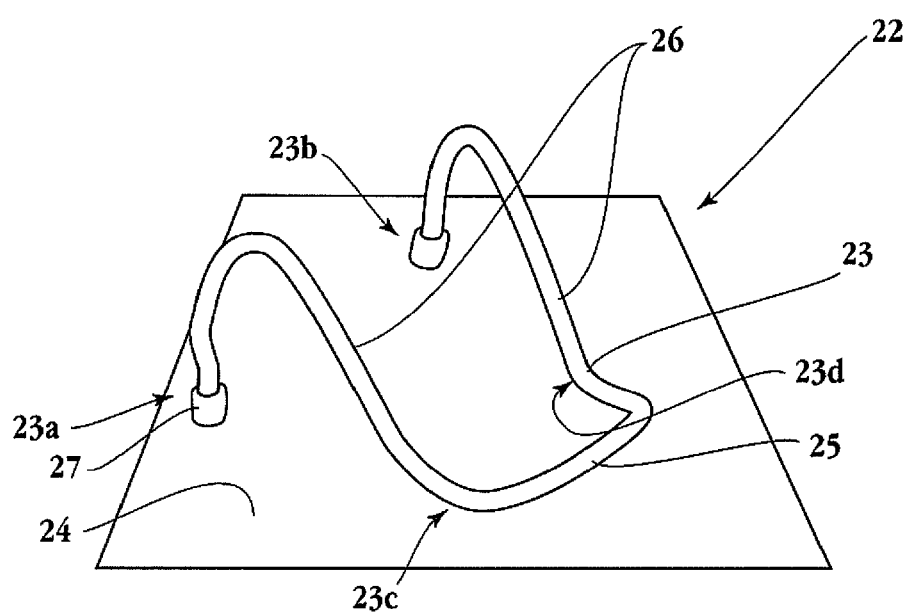
FIG. 4 depicts a flexible stand for supporting a scale-model surfboard, according to various embodiments.

In accordance with various embodiments, and referring now to FIG. 4, a stand 22 can be provided. The stand can be adapted to hold a scale model surfboard, as constructed in accordance with the present teachings, for display. In various embodiments, the stand is comprised of a material that is flexible enough such that it can be bent to a desired shaped, yet it can hold its shape once it has been bent. Thus, in various embodiments, a user can bend the stand into a desired configuration, and then display their finished work using the stand so configured. In some embodiments, for example, a flexible display stand 22 according to the present teachings can be constructed of bendable coat hanger metal material.

As shown in FIG. 4, according to various embodiments, stand 22 comprises a single linear piece of flexible metal material 23, optionally having a coating such as a plastic or polymeric coating, bent into a shape so that its two distal ends 23a, 23b contact the surface 24 upon which it sits at an acute angle or normal to the surface, and with two points of surface contact 23c, 23d along its central region. Between the two points of contact 23c, 23d at its central region, the metal material is bent upwards slightly on one side so as to form a lip or catch 25. On the other side, the metal material slopes diagonally upward, substantially higher than the lip or catch 25, forming a support region 26 disposed at an acute angle with the surface. The metal material then bends downward, terminating at the distal ends 23a, 23b in contact with the surface 24. An end cap 27 can be secured on one or both of the terminal ends.

Figure 5:
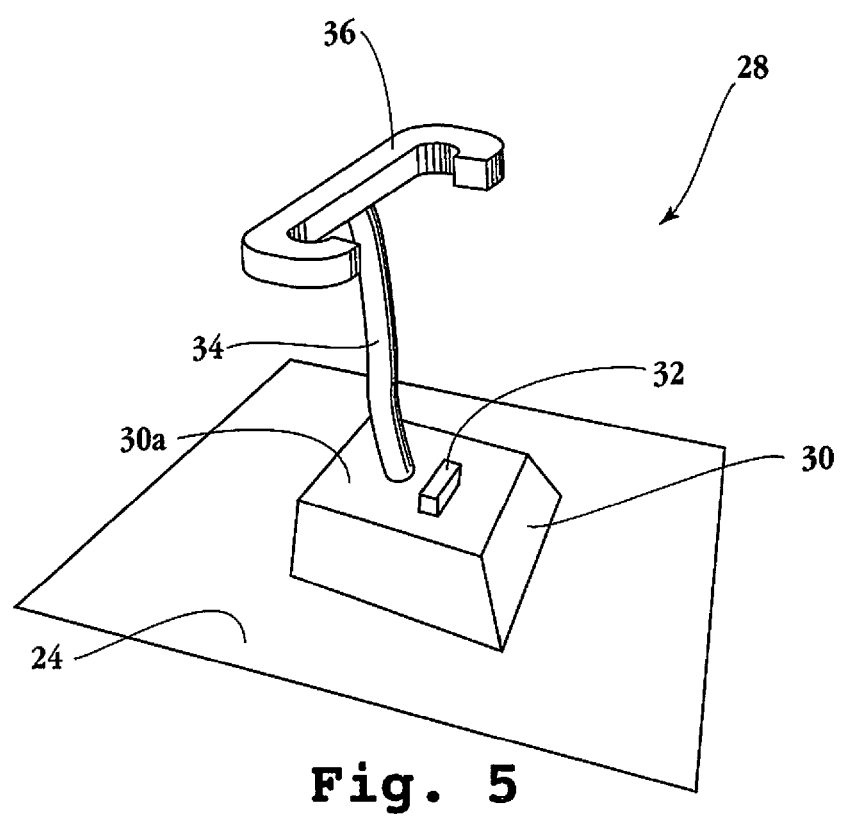
FIG. 5 depicts a pre-configured stand for supporting a scale-model surfboard, according to various embodiments.

In other embodiments, the kits can include pre-configured stands, such as stand 28 shown in FIG. 5, or other display options. In the embodiments of FIG. 5, stand 28 comprises a wooden base 30 that can sit upon a surface 24. An elongate stop 32 extends upwards from the upper surface 30a of the base 30. Adjacent the stop 32, a rod 34 protrudes upwardly from the upper surface 30a of the base 30. A support 36 is provided at the upper end of the rod 34. As shown, the support 36 can take an elongated "C" shape. In some embodiments, a stand similar to that depicted in FIG. 5 comprises a plastic or is injection molded.

Figure 6:
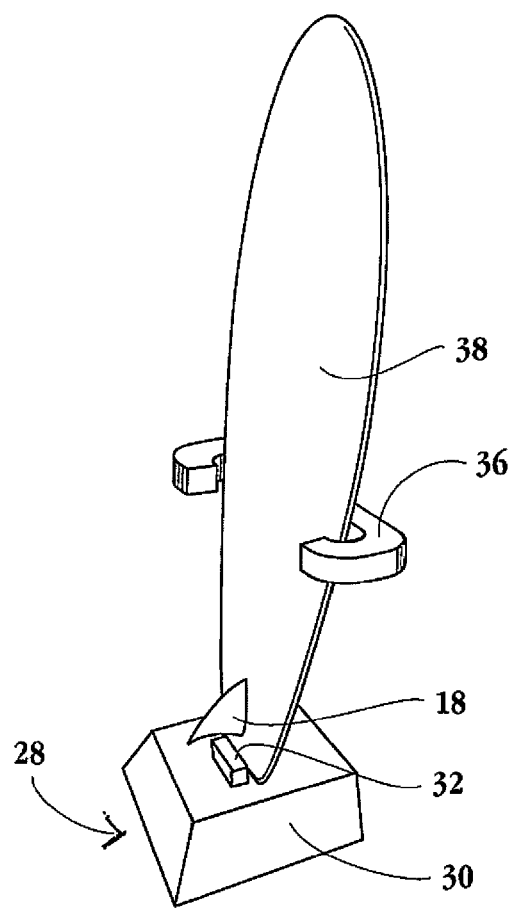
FIG. 6 shows a scale-model surfboard, including a fin towards its rearward end on its lower surface, supported by a pre-configured stand as in FIG. 5, according to various embodiments.

FIG. 6 depicts an exemplary finished wooden scale-model surfboard 38, comprising a fin 18 towards its lower end, constructed in accordance with various embodiments of the present teachings. As shown, surfboard 38 can be held in a pre-configured stand 28, in accordance with various embodiments of the present teachings. Particularly, one end of the surfboard 38 can be inserted through the "C" shaped support 36 and rest on the base 30, abutting the stop 32 so it will not slip off, with the other end of the surfboard 38 extending upwards.

Stands, such as 22 and 28, and other suitable display options can be made available from a supplier, among other ways, via an internet e-commerce website.

Foam Surfboards

Figure 7:
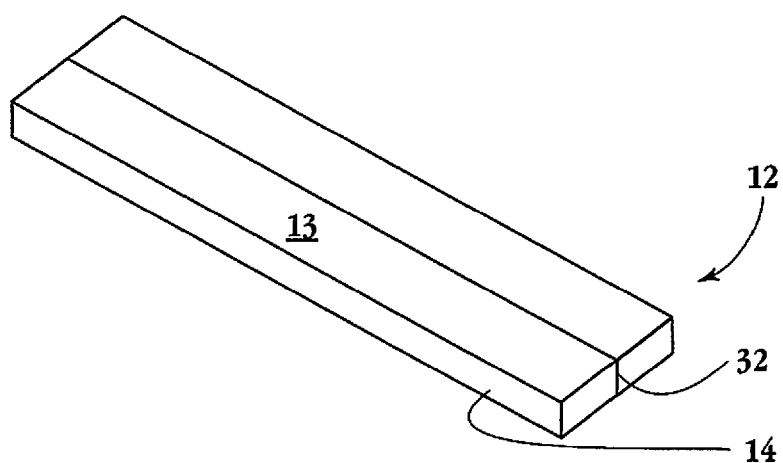
FIG. 7 is a perspective view of a pre-shaped blank comprising a foam material, including a top and a bottom curve (rocker), and a wooden stringer, according to various embodiments.

According to various embodiments, kits for constructing foam/fiberglass surfboards are provided. In this description, parts for foam/fiberglass surfboards that are the same as or similar to those described above with regard to wooden surfboards will be identified by like reference numerals. In accordance with the present teachings, various embodiments of kits for constructing foam/fiberglass surfboards can include one or more of the following:

In accordance with various embodiments, and referring to FIG. 7, a blank 12 can be included in the kit, comprising a foam material, such as STYROFOAM® (polystyrene) and polyurethane. The blank can be provided pre-shaped, with a top 13 and bottom curve (rocker) 14. The blank can include a wooden stringer 33, e.g., longitudinally through its centerline.

According to various embodiments, a template, such as template 16 shown in FIG. 2, can be provided comprising an outline of a surfboard to be constructed. The template can be, for example, a paper or paperboard template. A user can cut the template out with scissors, a knife, a razorblade, or the like (which can be included in the kit), and place it on the blank. Next, the user can trace around the template with a drawing instrument, such as a pencil, pen, marker, or the like, to create an outline of the surfboard on the blank. Various templates can be made available, e.g., at the kit's point of sale, by mail, by email, and/or via an internet e-commerce website. In some embodiments, a user can select from among a plurality of templates available from a supplier's website. For example, according to various embodiments, a user can download an electronic file, such as a PDF file, containing a desired template, and print the template on their computer- or network-connected printer.

According to various embodiments, the kit can include from about two to about five strips of sandpaper, and in some embodiments about three strips of sandpaper, of various grits. In some embodiments, a sanding block is included. These can be used, among other ways, to form rails and various contours of the surfboard.

In various embodiments, a dust mask or particulate respirator can be provided for a user to wear. For example, the mask or respirator can be configured to mitigate or prevent the inhalation of dust and/or other particulates while shaping the blank. In a variety of embodiments, respirators are air-purifying respirators.

In various embodiments, one or more plastic or resin fins can be provided. An exemplary fin, according to various embodiments, can be the same or similar in configuration to fin 18 depicted in FIG. 3. The number and type of fins can depend, for example, on the type or model of surfboard to be constructed. The fins can be of any suitable shape. According to various embodiments, the fins can be laser or die cut out of plastic, or, in some embodiments, the user can cast the fins with a resin and a mold that are provided in the kit.

According to various embodiments, a fiberglass cloth can be included in the kit. The cloth can be cut, for example, to fit on the shaped blank. Resin can then be applied to the cloth.

In various embodiments, kits in accordance with the present teachings can include a resin. For example, an ultraviolet (uv) curable resin can be included with the kit. In accordance with various embodiments, for example, an epoxy is included. In accordance with some embodiments, a polyester is included.

In various embodiments, mixing cups and/or stirring sticks can be included in the kit. In other embodiments, a user can be instructed to provide one or both of these items.

In a variety of embodiments, a resin brush can be included. A resin brush can be employed, for example, to spread resin onto the fiberglass cloth.

According to various embodiments, one or more pairs of gloves can be included in kits of the present teachings. In some embodiments, for example, rubber gloves are included. The gloves can be selected to provide protection against the particular materials and compositions employed in constructing a scale model surfboard.

Figure 8:
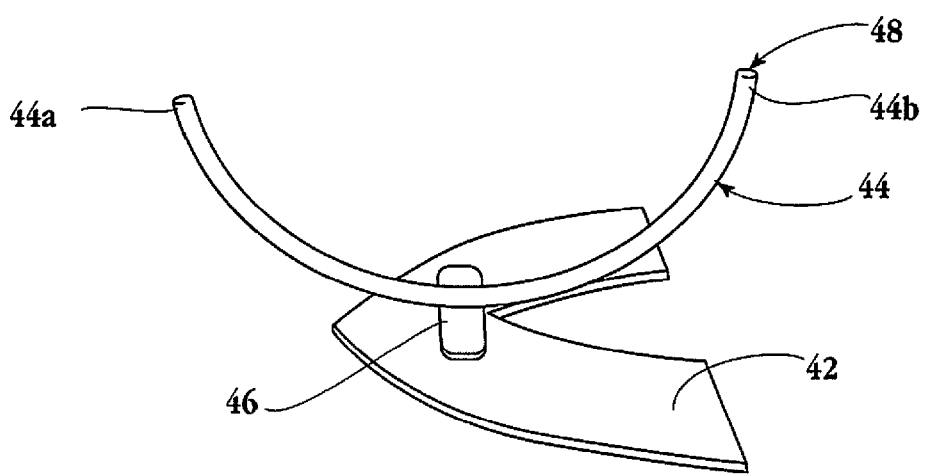
FIG. 8 depicts a stand employing magnetic means for supporting a blank or scale-model surfboard, in accordance with various embodiments; and, FIG. 9 depicts an exemplary finished foam/fiberglass scale-model surfboard supported in a flexible display stand, according to various embodiments.

In accordance with various embodiments, during the coating process, the shaped blank can be held by way of a support, such as stand 40 of FIG. 8. In various embodiments, a stand employing magnetic means can be used to hold down the shaped blank. For example, and without limitation, metal tabs can be inserted into the blank and magnets attached to the stand, or vice versa. Magnetic attraction between the metal tabs and the magnets can assist in stabilizing the blank, while applying a coating, such as a resin coating. In accordance with a variety of embodiments, one or more magnets of one polarity can be attached to a stand and one or more magnets of an opposing polarity can be attached to a shaped blank, so the stand and shaped blank can be held together by the attractive forces of the magnets. In addition, or as an alternative, to employing such stands to hold down shaped blanks during coating, such stands can be used for display purposes, e.g., displaying finished scale model surfboards.

In FIG. 8, according to various embodiments, the stand 40 is provided with a low-profile, substantially planar base 42 which, in this case, is generally "V" shaped. Bisecting the "V" shape, a semi-circular tube 44 is secured to the base 42 via a hold-down clamp 46. The two distal ends 44*a*, 44*b* of the tube 44 extend upwards. In various embodiments, a magnet 48 can be located at each of the distal ends.

In accordance with various embodiments, a flexible stand can be provided, such as stand 22 depicted in FIG. 4. The stand can be adapted to hold a surfboard, constructed in accordance with the present teachings, for display. In various embodiments, the stand can be comprised of a material that is flexible enough such that it can be bent to a desired shaped, yet it can hold its shape once it has been bent. Thus, in various embodiments, a user can bend the stand into a desired configuration, and then display their finished work using the stand so configured. In some embodiments, for example, a flexible display stand according to the present teachings can be constructed of bendable coat hanger metal material.

According to various embodiments, one or more decals, logos, and/or emblems can be included, which a user can apply to a surface of the scale-model surfboard, or emboss, as desired.

Further, in various embodiments, one or more paints can be included, and the user can paint their scale-model surfboard, Was desired.

In some embodiments, a tail pad can be included. The tail pad can be attached, e.g., toward the rearward end and on the upper surface of the scale-model surfboard.

Figure 9:
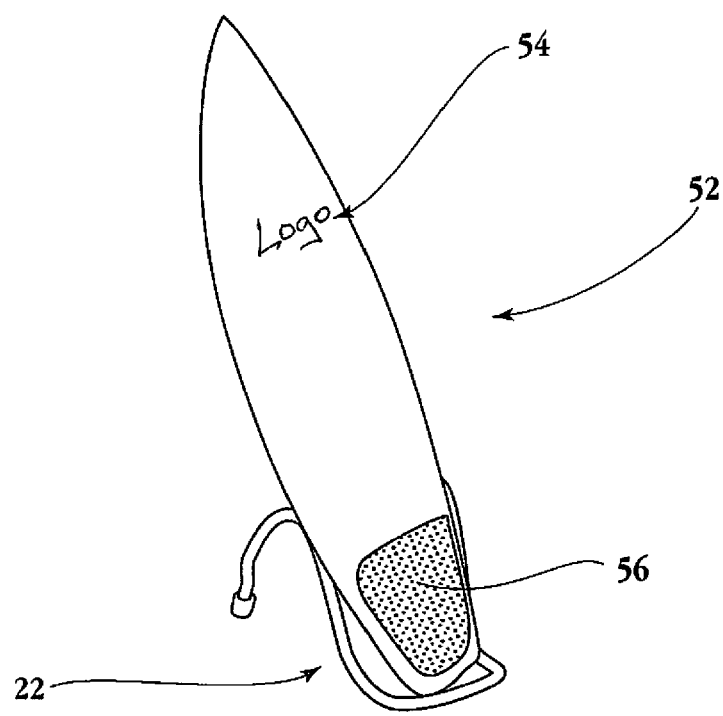

FIG. 9 depicts an exemplary finished foam/fiberglass scale-model surfboard 52 held in a flexible display stand, 22, in accordance with various embodiments of the present teachings. It is noted that surfboard 52 includes a decal 54 on its upper surface and a tail pad 56 at its rearward end 58.

It will be appreciated that various embodiments of kits of the present teachings bring simplicity and ease of use to surfboard construction. It will further be appreciated that a person using various embodiments of kits of the present teachings can become learned in making wooden and/or foam/fiberglass surfboards. For example, a person having learned from use of a kit as taught herein can apply their learnings to full scale surfboards. Moreover, those already learned in making surfboards can employ kits according to various embodiments of the present teachings in fast prototyping of design concepts.

All references set forth herein are expressly incorporated by reference in their entireties for all purposes.

Those skilled in the art can now appreciate from the foregoing description that the broad teachings herein can be implemented in a variety of forms. Therefore, while the present teachings have been described in connection with various embodiments and examples, the scope of the present teachings are not intended, and should not be construed to be, limited thereby. Various changes and modifications can be made without departing from the scope of the present teachings.

It is claimed:

1. An educational kit for construction of a scale-model surfboard that is a reduced-size representation of a selected full-size surfboard, comprising:
    a container and a plurality of selected components disposed in said container, including
    (i) a generally rectangular blank comprised of wood and being pre-shaped with (a) a top and
    (b) a bottom including a rocker curve;
    (ii) a template dimensioned to fit on the blank for tracing, the template representing in outline fashion a scale-model surfboard for construction; wherein the outline of said scale-model surfboard on said template maintains the relative proportions of the physical size of said selected full-size surfboard; and further wherein said outline of scale-model surfboard on said template comprises dimensions within a range of from 2 inches in width by 8 inches in length to 8 inches in width by 32 inches in length; and,
    (iii) one or more separate skeg or rail fins;
    (iv) at least one adhesive; and, (v) instructions comprising a plurality of steps for the construction of said scale-model surfboard, said instructions describing techniques utilized in full-size surfboard construction, and further said instructions including one or more steps for (a) shaping at least one of said plurality of selected components including the rectangular blank using said template and (b) adhesively attaching said one or more skeg or rail fins to said bottom.

2. The kit of claim 1, further comprising: an abrasive material for sanding the blank.

3. The kit of claim 1, further comprising: at least one coating composition.

4. The kit of claim 3, wherein said coating composition comprises a coloring composition.

5. The kit of claim 3, wherein said coating composition comprises a wax coating.

6. The kit of claim 1, further comprising: at least one item of personal protective gear.

7. The kit of claim 6, wherein said protective gear comprises a mask.

8. The kit of claim 6, wherein said protective gear comprises gloves.

9. The kit of claim 1, further comprising: a stand for supporting said blank or surfboard.

10. The kit of claim 9, further comprising: means for magnetically attaching said blank or surfboard to said stand.

11. The kit of claim 1, further comprising: instructions to access an online forum for user-provided posts concerning surfboards or surfboard construction.

12. An educational kit for carrying out, at reduced scale, one or more techniques for the construction of surfboards; said kit comprising a plurality of selected components including:
(i) a generally rectangular blank comprised of a wood and being pre-shaped with (a) a top and (b) a bottom including a rocker curve;
(ii) a template dimensioned to fit on the blank for tracing, the template representing in outline fashion a scale-model surfboard; wherein said outline of said scale-model surfboard on said template is a reduced-size representation of a selected full-size surfboard that maintains the relative proportions of the physical size of said selected full-size surfboard; and further wherein said outline of scale-model surfboard comprises dimensions within a range of from 2 inches in width by 8 inches in length to 8 inches in width by 32 inches in length;
(iii) instructions providing one or more techniques for constructing the scale-model surfboard, wherein at least one of said techniques is also useful for full-size surfboard construction, and further wherein said instructions include shaping at least one of said plurality of selected components including the rectangular blank using said template, wherein said instructions further include adhesively attaching (a) said one or more skeg or rail fins to said bottom and (b) said tail pad to said top;
(iv) one or more separate skeg or rail fins;
(v) a tail pad;
(vi) at least one adhesive; and,
(vii) a container for holding items (i) to (vi).

13. The kit of claim 1, wherein said components further include a tail pad, and further wherein said instructions further include one or more steps for adhesively attaching said tail pad to said top.

14. A method for making a scale-model surfboard that is a reduced-size representation of a selected full-sized surfboard, comprising:
(i) selecting a full-size surfboard;
(ii) providing a kit comprising,
(a) a generally rectangular blank comprised of wood and being pre-shaped with (1) a top and (2) a bottom including a rocker curve;
(b) a template dimensioned to fit on the blank for tracing; wherein the template represents in outline fashion a scale-model surfboard of the selected full-sized surfboard; and wherein said outline of said scale-model maintains the relative proportions of the physical size of the selected full-size surfboard; and further wherein said outline of said scale-model surfboard on said template comprises a width dimension within a range of from 2 inches to 8 inches and a length dimension within a range of from 8 inches to 32 inches;
(c) one or more skeg or rail fins;
(d) at least one adhesive;
(e) instructions comprising a plurality of steps for the construction of the scale-model surfboard, the instructions describing one or more techniques utilized in full-size surfboard construction, said instructions including one or more steps for (a) shaping at least one of said plurality of selected components including the rectangular blank using said template and (b) adhesively attaching said one or more skeg or rail fins to said bottom; and
(f) a container for holding items (a) to (e); and
(iii) using the kit, constructing the scale-model surfboard that is a reduced-size representation of the selected full-sized surfboard.

15. The method of claim 14, wherein step (iii) includes (a) shaping said generally rectangular blank and (b) adhesively attaching said one or more skeg or rail fins to said bottom.

16. The method of claim 14, wherein the scale-model surfboard constructed in step (iii) comprises a scaling factor with respect to the selected full-size surfboard of no greater than ¼ scale.

* * * * *